United States Patent [19]

Ellison

[11] Patent Number: 5,317,632
[45] Date of Patent: May 31, 1994

[54] TIMED TELEPHONE SILENCER. (TELEPHONE SILENCER WITH TIMER FUNCTION)

[76] Inventor: David W. Ellison, 130 N. Small Ave., Kankakee, Ill. 60901

[21] Appl. No.: 779,042

[22] Filed: Oct. 18, 1991

[51] Int. Cl.$^5$ .............................................. H04M 1/66
[52] U.S. Cl. .................................... 379/199; 379/200
[58] Field of Search ................ 379/199, 200, 190, 373

[56] References Cited

U.S. PATENT DOCUMENTS

| | | | |
|---|---|---|---|
| 4,260,855 | 4/1981 | Rubinstein | 379/140 |
| 4,405,839 | 9/1983 | Groff | 379/188 |
| 4,480,154 | 10/1984 | Klee | 379/373 |
| 4,683,583 | 7/1987 | Kossor | 379/61 |
| 4,924,499 | 5/1990 | Serby | 379/373 |

*Primary Examiner*—James L. Dwyer
*Assistant Examiner*—Ahmad F. Matar

[57] ABSTRACT

A timed telephone silencer with its associated features is disclosed, its intended use being for selectively disabling (silencing) a telephone for a user-determined interval during a time period when the user does not wish to be disturbed by telephone calls. The device provides a cord with attached modular plug for connecting the device to a telephone line, and a cord with modular jack for connecting a telephone to the device. A quartz-controlled clock provides the timing function, with a selector knob on the top external surface of the housing for choosing the number of hours that one wishes to have his telephone remain silent. The same knob can be used to instantly abort a period of telephone silence, or make the telephone operational for a few moments or minutes and then return to the period of telephone silence. The user can see by a glance at the device whether his telephone is in the on or off mode, this possible because of indicator lights on the device. At the end of the user-determined period of telephone silence, the device automatically returns an attached telephone to full function. The device operates on 110 VAC power.

1 Claim, 3 Drawing Sheets

TIMED TELEPHONE SILENCER. (TELEPHONE SILENCER WITH TIMER FUNCTION)

BACKGROUND OF THE INVENTION

1. Field of the Invention

The present invention relates to the field of telephone control devices, and is more particularly directed to a timed telephone silencer device which allows the user to disable the function of his telephone for a predetermined timed interval. The user is thereby able to choose not to be disturbed by the ringing of his telephone when he is sleeping, resting, sick, etc.

2. Description of the Prior Art

Some related devices have been developed, allowing one to silence the ringer of his telephone, some of these devices requiring that the user manually restore his telephone ringer's function when he again wishes to hear incoming calls. At least one automatically turns the ringer back on at the end of the user-determined period of silence. At least one automatically turns the telephone off and on each 24 hour period. The object of the present invention is to provide the user with a device that he can use to turn off his telephone (all functions) for a set period of time, and then the device will automatically restore all functions at the end of the selected time period. The advantage of the present invention is that it presents the user with a device which performs timed telephone silence in a simpler manner with no programming to do, and no other functions such as traditional clock, alarm, and calendar functions, since most users would already have an alarm clock and a calendar. At least one related device that has already been patented is battery-operated, resulting in the need to worry about changing or recharging batteries. This timer operates on AC, eliminating the need to change or recharge batteries.

SUMMARY OF THE INVENTION

Accordingly, the primary object of the present invention is to provide a telephone silencer that can be set by the user to silence a telephone for a period of time; this particular unit being able to silence the telephone for up to twelve hours. At the end of the set period of time, the unit automatically restores the telephone's full function. An additional goal of the present invention is to provide a timed telephone silencer device that is compact, and which provides a modular plug for plugging the silencer device into a telephone line and which provides a modular jack for plugging a telephone into the device. Finally, it is the object of the present invention to accomplish its simple function in a very simple way that requires no complicated programming, that has no buttons to push or switches to switch, making its use simple and allowing for the manufacture and marketing of a reasonably-priced item. Simplicity of operation and low purchase price are especially important, since many of those who will be interested in such a device are the sick and elderly.

Figure 1:
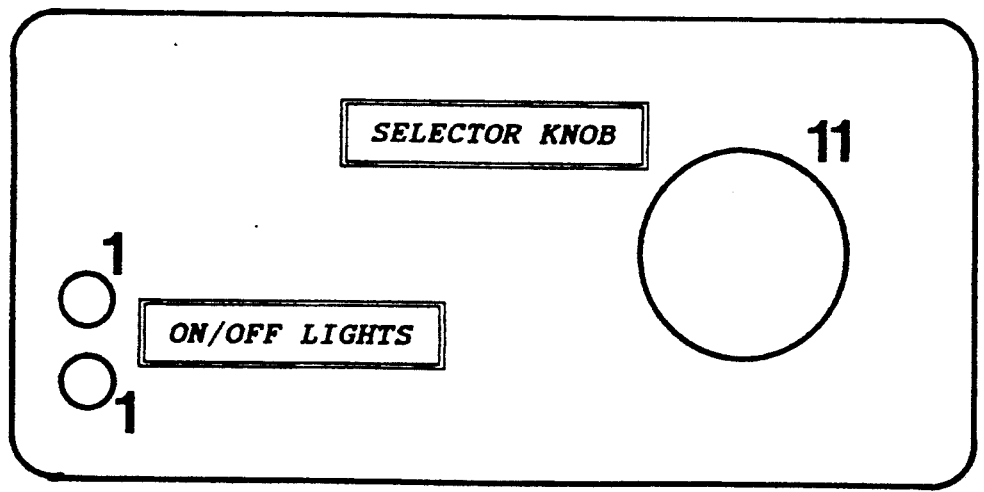
FIG. 1 presents a simple drawing of the oblong box which will house the wiring and working parts of the invention. This is a view of the top of the box, showing [1]the on/off lights that indicate the current mode status of the unit, and [11] the knob the user will utilize to choose (set) the number of hours he wishes his telephone to be silent. At the time of assembly of each unit, a custom-printed label will be affixed to the top of the box, said label showing the commercial name that will be used in marketing the unit, what the two lights indicate when lit, and will provide a dial or clockface that will allow the user to see where to position the knob when selecting a period of telephone silence.

Explanation of Reference Numerals. [1]On/off lights. [2]1.5 amp fuse. [3]110 VAC lever switch. [4]Double-pole-double-throw relay with 110 VAC coil. [5]110 VAC quartz clock motor. [9]Standard telephone cord: one, with modular plug, connected to the phone line, the other equipped with modular jack, for connecting a telephone to the device. [10]Incoming 110 VAC power line. [10-b]Negative line to AC.

DESCRIPTION OF THE PREFERRED EMBODIMENTS

Figure 2:
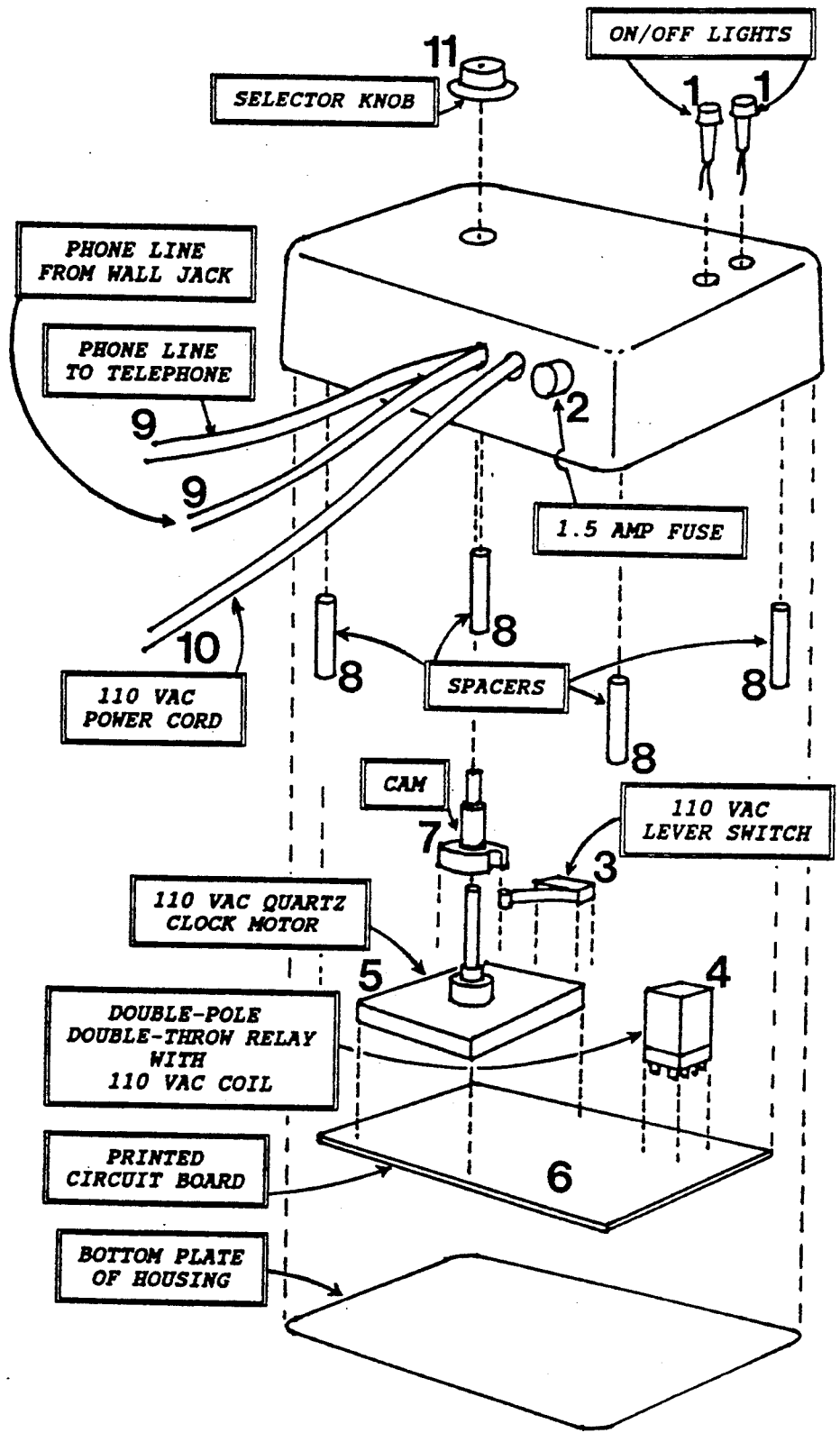
FIG. 2 presents an exploded view of the invention, to show the relationship of the various parts. In the upper area of the sight one sees an oblique view of the top, rear, and left sides of the box. At the lower area of the sight one sees the bottom plate of the box. Explanation of Reference Numerals: [1]On/off lights. [2]1.5 amp fuse. [3]110VAC lever switch. [4]Double-pole-double-throw relay with 110 VAC coil. [5]110 VAC quartz clock motor. [6]Printed circuit board. [7]Machined cam that slip-fits to hour shaft of clock motor. [8]Spacers to hold circuit board assembly in place. [9]Cords: One to the telephone line, one to the telephone. [10 ]110 VAC power cord. [11]Selector knob, which fits over upper shaft of machined cam.
Figure 3:
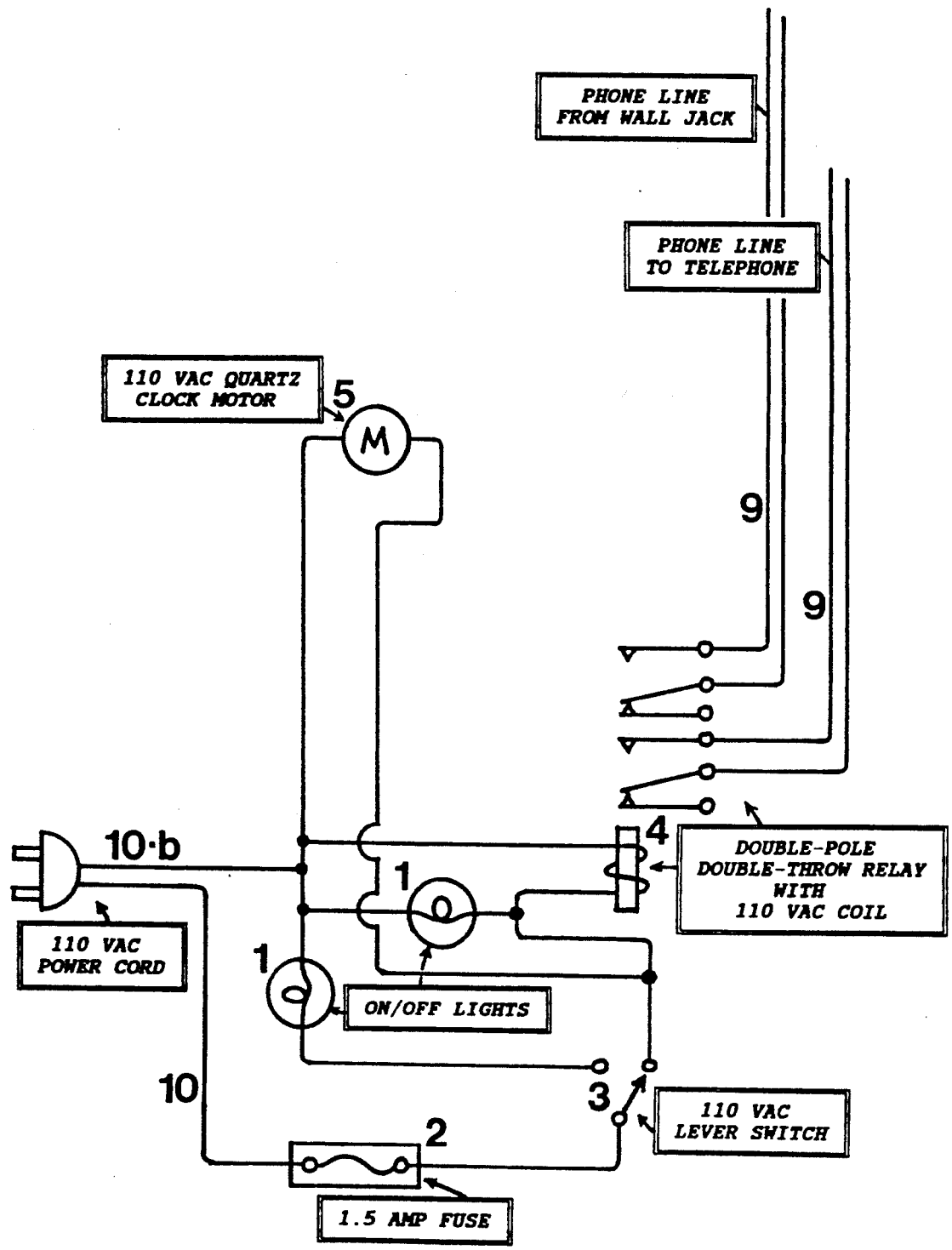
FIG. 3 presents a simple electrical schematic which is laid out to facilitate ease of comprehension and not so much in relation to the actual physical location of the various components in the box and the layout of the circuit board that will be used. However, this schematic DOES correctly represent the schematic concept that is used in the working prototypes and the production models one hopes to market.

Referring to FIGS. 1 and 2, a timed telephone silencer is shown. The timed silencer device is designed to selectively disable the attached telephone for a user-selected timed interval. The exterior of the timed telephone silencer device consists of a housing, an attached cord [#9 on drawings]for plugging the unit into the telephone line, another attached cord [#9 on drawings]-with a modular jack which allows the telephone to be plugged into the device, two indicator lights [#1 on drawings]showing whether the phone is presently silenced or operational, a simple knob [#11 on drawings]used to set the amount of telephone silence the user wishes to choose (also allowing him at any time to easily cancel the telephone silence by turning the knob back to "zero"), the knob solidly attached by means of a set screw to the shaft (protruding from the interior of the unit of a cam [#7 on drawings], the cam (continuing with the interior of the unit) actuating a lever switch [#3 on drawings]which actuates a double-pole-double-throw relay [#4 on drawings]which disconnects/reconnects the telephone wires involved and turns the timer's quartz clock motor [#5 on drawings]on and off. Once the user turns the knob away from the "zero"position, (he can turn the knob [#11 on drawings]clockwise or counter clockwise, this being possible because the cam [#7 on drawings]is slip-fitted over the hour shaft of the timer's quartz clock motor [#5 on drawings]), the telephone is instantly disabled, and the timer's quartz clock motor [#5 on drawings]begins to function. This is accomplished by the knob [#11 on drawings]bringing the cam AWAY from the one position in which the lever switch [#3 on drawings]allows the double-pole-double-throw relay [#4 on drawings]to close the telephone circuits involved and open the timer's quartz clock motor's circuit, thereby simultaneously disabling the telephone by opening its circuits and turning on the timer's quartz clock motor by closing its circuit. The unit now begins to time the user-selected period of telephone silence as the cam [#7 on drawings]turned by the timer's quartz clock motor [#5 on drawings]is gradually brought around to the "zero" position, where a depression machined into the outer face of the cam allows the lever switch [#3 on drawings]to activate the double-pole-double-throw relay [#4 on drawings], the relay now closing the telephone circuits (tip wire and ring wire) and opening the circuit of the timer's quartz clock motor [#5 on drawings]thereby ending the period of telephone silence and stopping the clock motor with the knob [#11 on drawings]at the "zero"position on the unit's external time dial.

I claim:

1. A device for disabling the dialing and ringing functions of a telephone for a period of time selected by the user, after which period of time the telephone automatically is restored to full function; the device comprises:
 (a) one knob on the exterior of the device for setting or controlling the device as opposed to various programming buttons and switches;
 (b) an internal design based on the use of a clock-driven cam, operating a lever switch, with the lever switch operating a double-pole-double-throw relay, the latter disabling or enabling the telephone's function;
 (b1) the external knob is affixed by means of a set screw to the upper end of the shaft of the cam, which upper end protrudes slightly through the top of the housing of the device; the knob can therefore turn the cam, which is slip-fitted onto the hour shaft of the clock motor; turning the knob, therefore, causes a little depression machined into the outer face of the cam to move away from the lever switch, activating the lever switch, it, in turn, activating the relay, the relay, in turn, disabling telephone function; the clock motor now functions, and brings the cam slowly back around to where the depression in the cam face causes the lever switch to trip and actuate the relay, thereby restoring telephone function, and stopping the clock.

* * * * *